Aug. 12, 1941.  E. TVETER  2,252,101
POPCORN VENDING MACHINE
Filed July 5, 1938  5 Sheets-Sheet 1
Fig.1.
Fig.2.
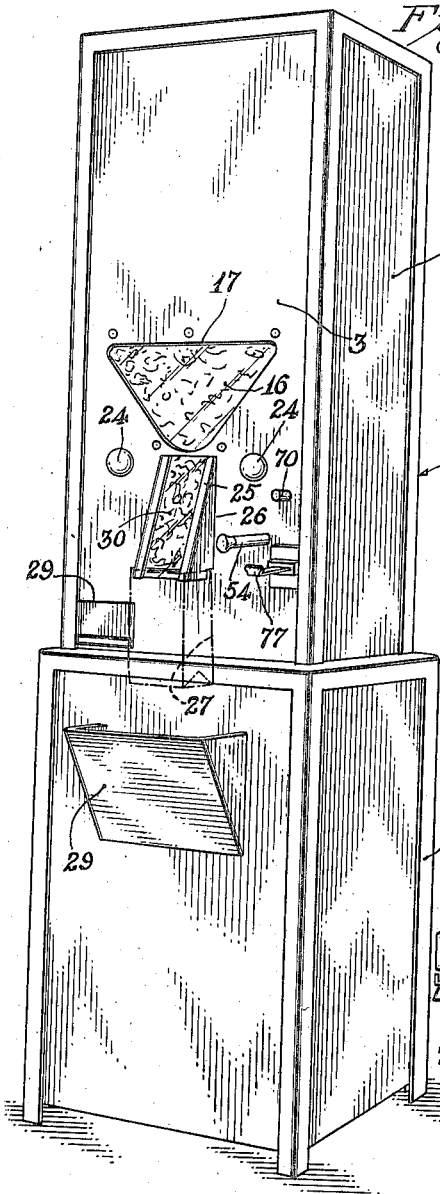
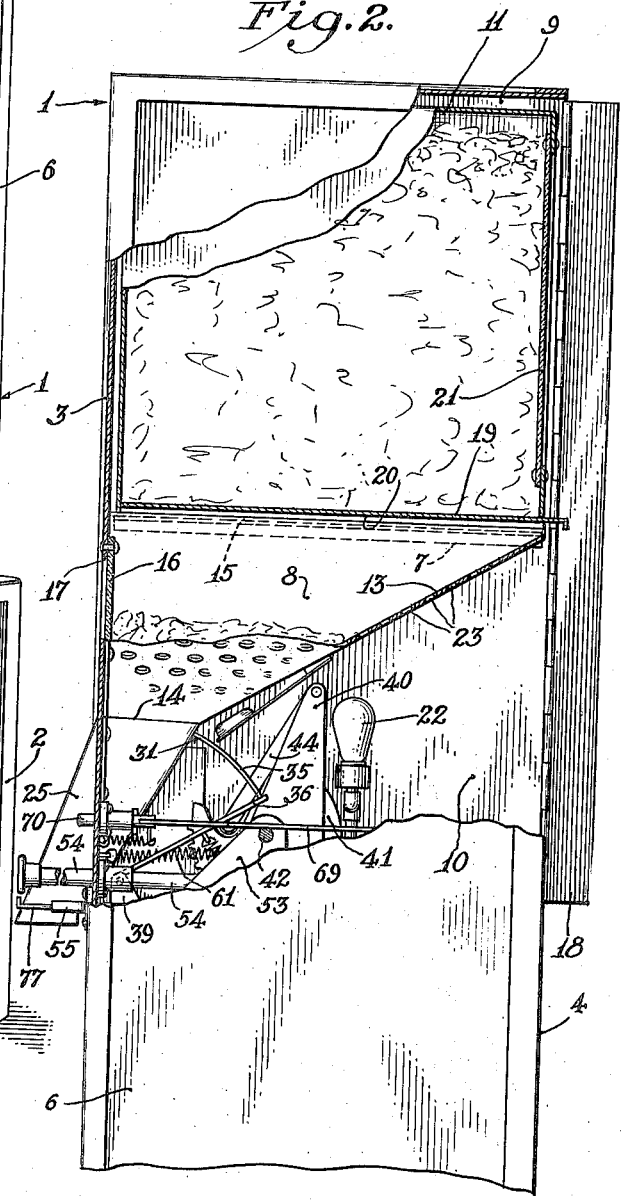
Inventor
Einar Tveter
BY
Parker, Carlson, Pitzner & Hubbard
Attorneys.

Aug. 12, 1941.  E. TVETER  2,252,101
POPCORN VENDING MACHINE
Filed July 5, 1938  5 Sheets-Sheet 2

Inventor
Einar Tveter
BY
Parker, Carlson, Pitzner & Hubbard
Attorneys.

Aug. 12, 1941.   E. TVETER   2,252,101
POPCORN VENDING MACHINE
Filed July 5, 1938   5 Sheets-Sheet 3
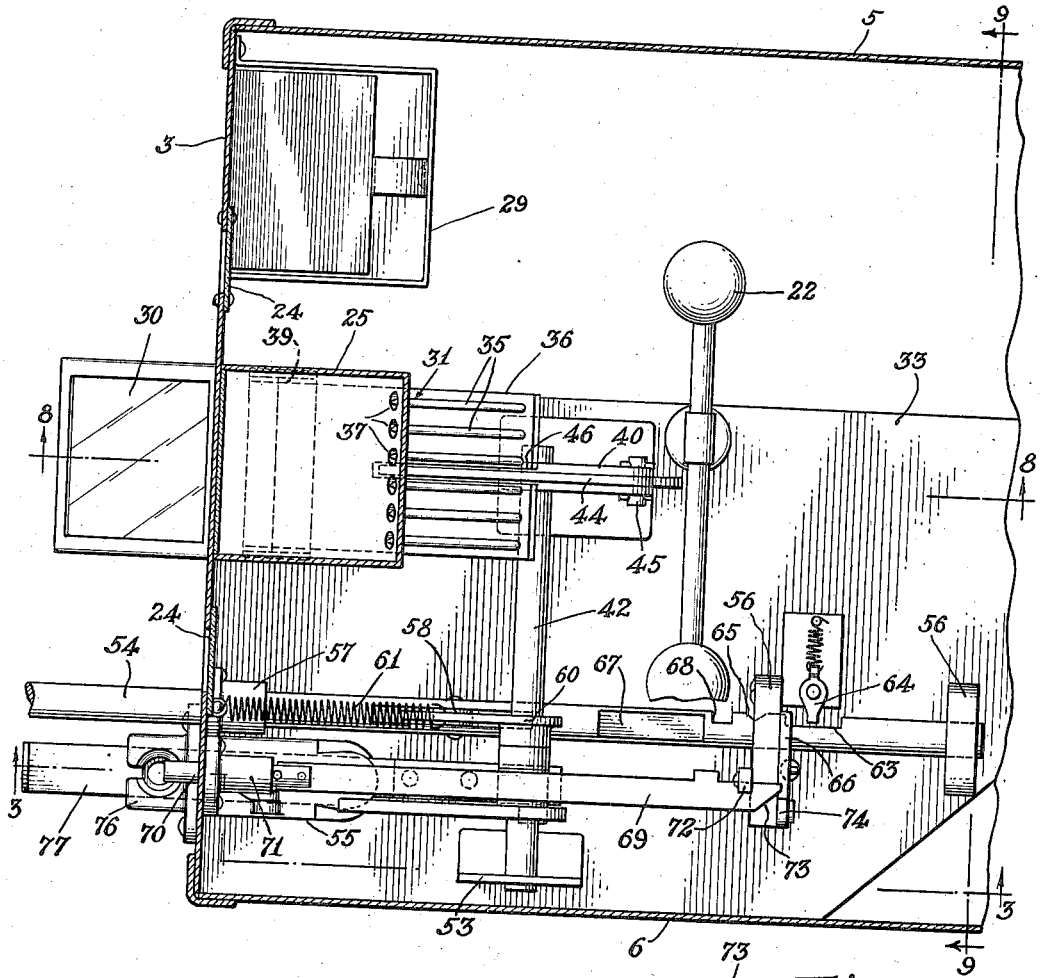
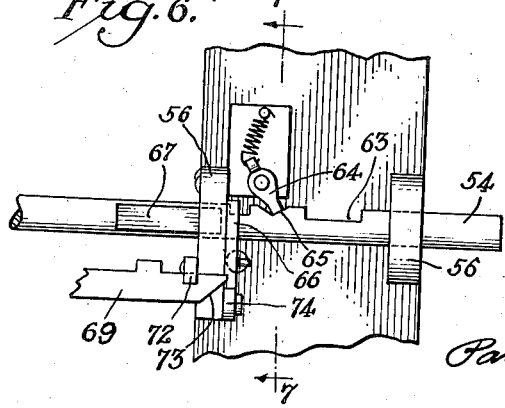
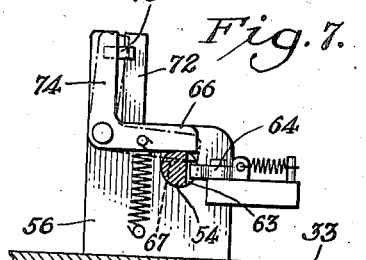
Inventor
Einar Tveter
BY
Parker, Carlson, Pitner & Hubbard
Attorneys.

Aug. 12, 1941.　　　　E. TVETER　　　　2,252,101
POPCORN VENDING MACHINE
Filed July 5, 1938　　　　5 Sheets-Sheet 4

Inventor
Einar Tveter.
BY Parker, Carlson, Pitzner & Hubbard
Attorneys.

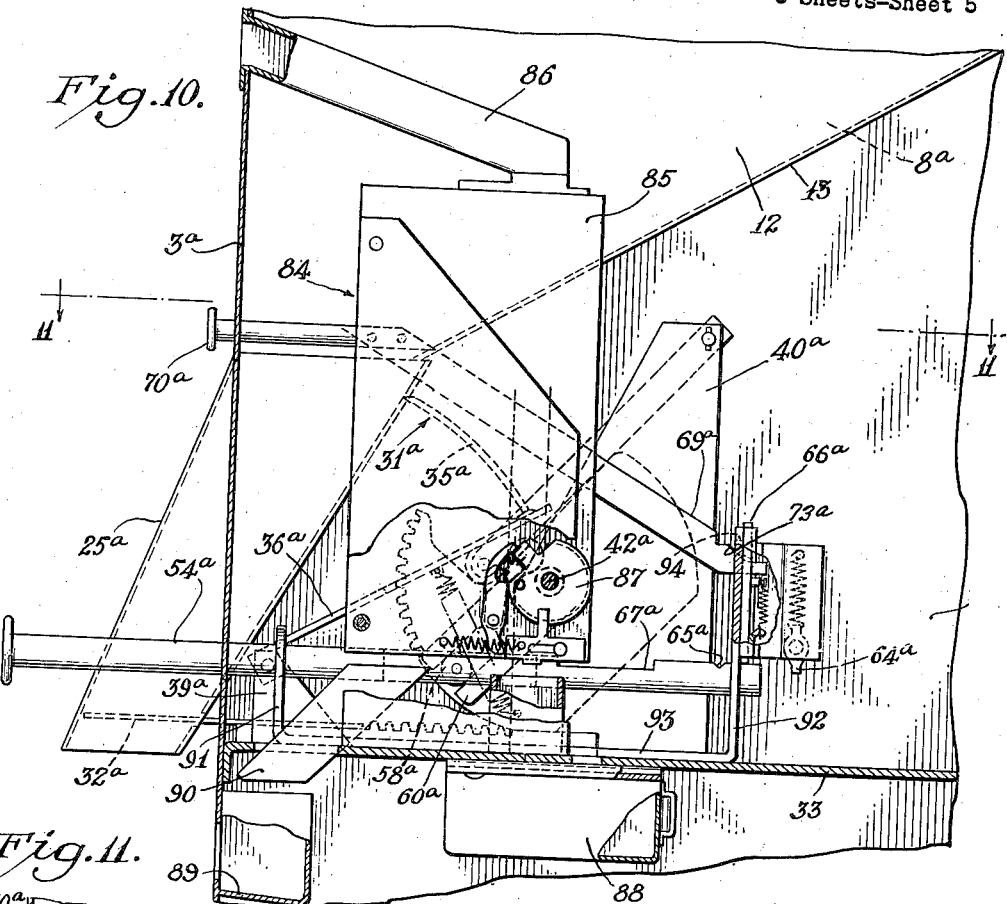
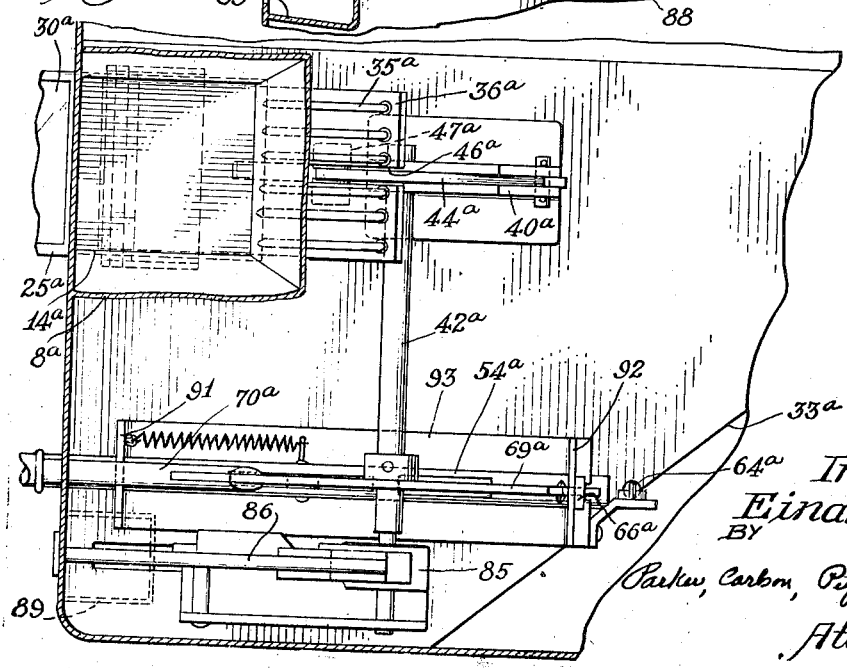

Patented Aug. 12, 1941

2,252,101

UNITED STATES PATENT OFFICE 2,252,101

POPCORN VENDING MACHINE

Einar Tveter, Chicago, Ill.

Application July 5, 1938, Serial No. 217,620

14 Claims. (Cl. 221—112)

The present invention relates generally to vending machines, and has particular reference to a new and improved machine for vending pop corn from bulk storage in measured quantities.

One of the objects of the invention is to provide a novel pop corn vending machine having a hopper with a delivery spout, and having a compartment over the hopper in which a container filled with pop corn is adapted to be removably inserted and when in position is adapted to communicate with and constitute in effect an upward continuation of the hopper.

Another object of the invention is to provide a new and improved pop corn vending machine of the foregoing character in which the container is closed to preserve the pop corn against deterioration during shipment, and has a removable bottom wall adapted to be slidably withdrawn from the machine when the container is in position therein so as to permit the pop corn to fill the hopper.

Another object resides in the provision of novel means for keeping the pop corn in the hopper warm.

A further object resides in the provision of a new and improved pop corn vending machine having a delivery spout with valve means operable to measure the quantity of corn for each sale.

Still another object is to provide a new and improved pop corn vending machine having a hopper with a transparent front wall through which the condition and the level of the pop corn may be observed, and having a delivery spout opening from the bottom of the hopper and provided with a transparent wall through which the customer can observe when the spout is empty.

A detailed object is to provide a pop corn vending machine having a measuring and delivery spout with inlet and discharge valves, and novel means for opening and closing said valves alternately and in sequence.

Further objects and advantages will become apparent as the description proceeds.

In the accompanying drawings, Figure 1 is a perspective view of a pop corn vending machine embodying the features of my invention.

Fig. 2 is a fragmentary view of the machine partially in vertical section.

Fig. 5 is a fragmentary horizontal sectional view taken substantially along line 5—5 of Fig. 3.

Fig. 6 is a fragmentary detail view of the actuating mechanism.

Fig. 7 is a vertical sectional view taken along line 7—7 of Fig. 6.

Fig. 10 is a view similar to Fig. 3, but illustrating a modified form of the invention.

Fig. 11 is a fragmentary horizontal sectional view taken substantially along line 11—11 of Fig. 10.

Figure 3:
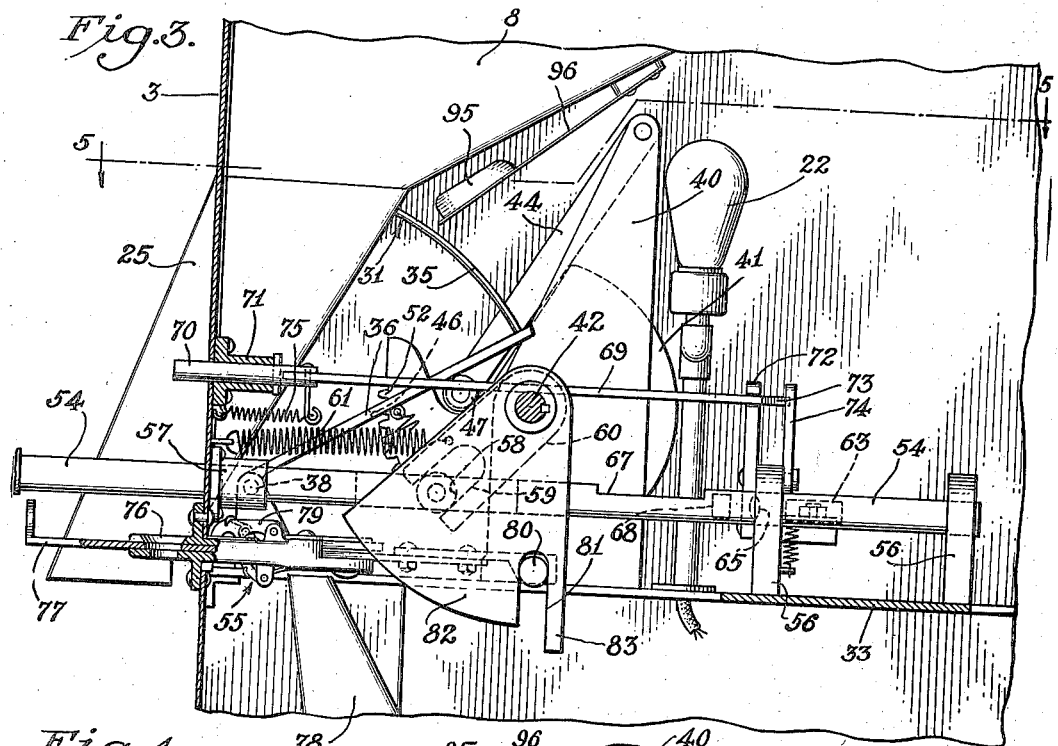
Fig. 3 is a fragmentary vertical sectional view taken substantially along line 3—3 of Fig. 5, and illustrating the parts in normal position.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the pop corn vending machine constituting the exemplary embodiment of the invention comprises a vertical cabinet 1 mounted on a stand or pedestal 2, and having front, rear and side walls 3 to 6. Mounted respectively on the side walls 5 and 6 at an intermediate elevation are two horizontal angle bars 7 which serve as a support for a suitable hopper 8 dividing the interior of the cabinet 1 into upper and lower compartments 9 and 10. A replaceable receptacle 11 adapted to be filled with popped corn also is supported on the bars 7 directly over the hopper 8. In the present instance, the hopper 8 comprises downwardly converging side walls 12 joined at their forward edges to the front wall 3 of the cabinet 1, and a downwardly and forwardly inclined rear wall 13. The hopper 8 has a restricted outlet opening 14 at the bottom, and at the top is fully open and has external flanges 15 resting on the angle bars 7. Preferably, a transparent window 16 is mounted in an opening 17 in the front wall 3 of the cabinet 1 so that the pop corn in the hopper 9 will be visible from the exterior of the machine. As a result, the customer is able to observe the character and condition of the corn before making a purchase, and the service man can quickly determine whether the supply of corn in the machine is in immediate need of replenishment.

The container 11 is adapted to be inserted into the upper compartment 9 through the rear wall 4. A door 18 hinged on the cabinet 1 is adapted to close the wall 4, and when open permits access to the hopper 8 and the removal of an emptied container and insertion of a filled container. The container 11 may be of any suitable character and form, and preferably conforms closely in size and shape to the interior of the compartment 9. A slide gate 19 is removably supported in opposed guide grooves 20 on two opposite walls of the container 11, and normally closes the bottom of the container to confine the freshly popped corn therein during transit. The gate 19 may be withdrawn rearwardly when the door 18 is open and after the container 11 is in position, to permit the corn to drop into the hopper 8, and the gate must be drawn out before the door can be closed. It will be evident that the container 11 in effect constitutes an upward continuation of the hopper 8. Preferably, a narrow vertical sight glass 21 is mounted in the rear wall of the container 11 so that the level of the corn may be observed upon opening the door 18.

The container 11 is fully closed in transit, and preserves the corn against deterioration. Suitable means is provided for heating the corn in the hopper 8 to keep it warm and fresh for a reasonable period of time normally required to sell the batch. This means may comprise electric heating elements, such, for example, as two electric lamps 22 mounted in the cabinet 1 below the wall 13 of the hopper 8. A plurality of small holes 23 in the wall 13 permit the warm air from the region of the lamps 22 to circulate through the corn. If desired, two colored bull's-eye lenses 24 may be mounted in the front wall 3 of the cabinet 1 respectively in line with the lamps 22 as a visual indication when the light is on.

The corn is vended from the machine through a vertical measuring spout 25 which is suitably connected at the upper end to the hopper 8 in communication with the outlet opening 14, and which extends downwardly and forwardly at a small angle through an opening 26 in the front wall 3 of the cabinet 1. The discharge end of the spout 25 is located externally of the cabinet for convenient insertion into the top of a paper bag or receptacle 27 adapted to receive the corn. The position of the bag 27 is limited by a stop 28 in the space between the wall 3 and the spout 25. A pocket 29 in the front wall 3 of the cabinet is adapted to contain a supply of the bags 27 for use by the customers. Preferably, a transparent glass window 30 is mounted in the front wall of the spout 25, and permits the customer to see the corn and to determine when the spout is empty.

The spout 25 serves to measure the quantity of corn delivered in each sale. Thus, it is provided respectively at its upper and lower ends with a cut-off valve 31 and a discharge valve 32. These valves are operated alternately and in timed sequence. Normally, the valve 32 is closed, and the valve 31 is open to permit a measured quantity of corn from the hopper 8 to fall into and fill the spout 25. To empty the spout 25, the valve 31 is closed, and then the valve 32 is opened. To refill the spout 25, the valve 32 is closed, and then the valve 31 is opened.

Any suitable mechanism may be provided to actuate the valves 31 and 32 in the foregoing sequence. In its preferred form, the actuating mechanism comprises a horizontal supporting base plate 33 mounted on angle bars 34 within the compartment 10. The cut-off valve 31 consists of a plurality of closely spaced pointed prongs 35 mounted on the free upper end of a hinged plate 36, and being arcuate about the pivotal axis of the plate. Upon oscillation of the plate 36 in a forward direction, the prongs 35 will enter and move through a plurality of apertures 37 in the rear wall of the spout 25 to bridge the outlet opening 14 of the hopper 8. Upon reverse movement of the plate 36, the prongs 35 will be fully withdrawn. The valve plate 36 is pivotally mounted at its lower end on a pin 38 supported at opposite ends in two spaced angle brackets 39 with legs extending toward each other into closely spaced relation and secured to the base plate 33.

Figure 4:
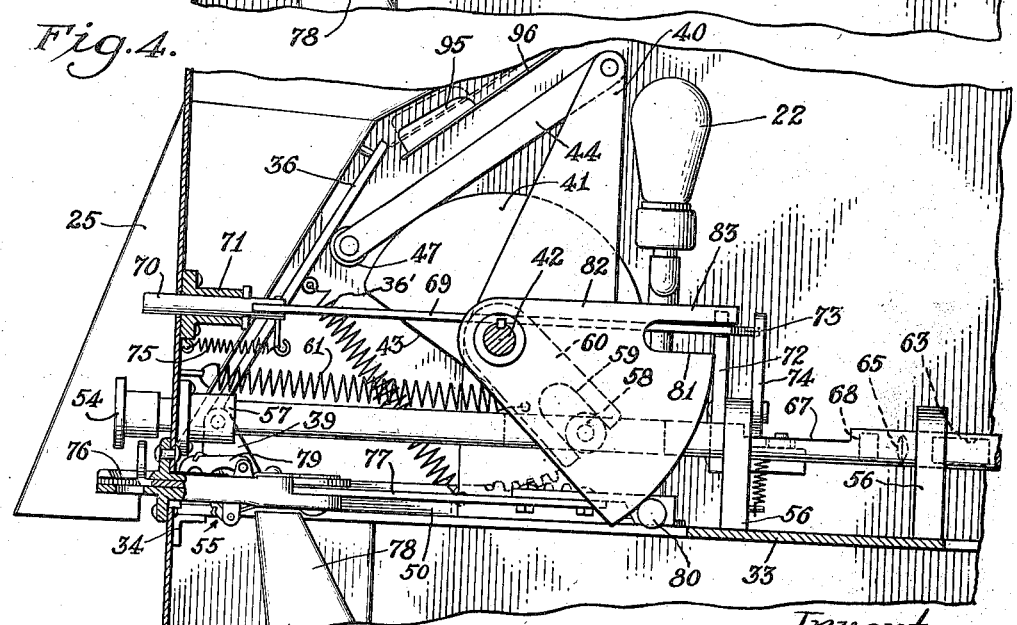
Fig. 4 is a view similar to Fig. 3, but illustrating the parts in position of actuation to vend a measured quantity of pop corn.

Secured on the base plate 33 rearwardly of the brackets 39 are two closely spaced vertical angle brackets 40. A rotary disk 41 is mounted on an actuating shaft 42 between the brackets 40, and is notched to provide a peripheral cam face 43. Bearing intermediate its ends against the face 43 is a lever 44 which is pivotally mounted at its upper end on a pin 45 between the brackets 40 for free swinging movement. The valve plate 36 is formed in its free end with a longitudinal slot 46 receiving the disk 41, and rests at opposite sides of the slot against rollers 47 on the lower end of the lever 44. Upon counterclockwise rotation of the cam disk 41 from the position shown in Figs. 3 and 8, the cam face 43 will swing the lever 44 forwardly, and the rollers 47 thereupon will swing the plate 36 forwardly to close the valve 31. Upon continued movement of the disk 41, the lever 44 will ride without additional movement on the arcuate periphery of the disk as illustrated in Fig. 4. Upon reverse movement of the cam disk 41, the plate 36 and the lever 44 are released for return by a tension spring 36' into initial position.

The discharge valve 32 consists of a plate extending reciprocably through aligned slots 48 and 49 in the front wall 3 of the cabinet and the rear wall of the spout 25, and is guided between the brackets 39. The inner end of the slide valve 32 is adjustably secured to an elongated bar 50 guided for reciprocation on the base plate 33 between the brackets 40 and the legs of the brackets 39. A longitudinal rack gear 51 formed in the bar 50 is adapted for meshing engagement with a gear segment 52 formed in the periphery of the cam disk 41. Gear engagement occurs to effect opening and closing of the slide valve 32 upon rotation of the disk 41 in opposite directions after movement of the valve 31 into closed position. More particularly, the disk 41 is operable during a first range of movement including the initial counterclockwise rotation and the final clockwise rotation to close and open the valve 31, and during a second range of movement including the final counterclockwise rotation and the initial clockwise rotation to open and close the valve 32. It will be understood that the valve 32 may be opened and closed repeatedly upon rotating the disk reversibly in the second range without affecting the position of the valve 31.

The operating shaft 42 is journaled in and extends from the brackets 40 to one side of the compartment 10 where it is supported in a bearing bracket 53 on the base plate 33, and is operatively connected for rotation conjointly by a push rod or bar 54 and a coin mechanism 55.

Figure 8:
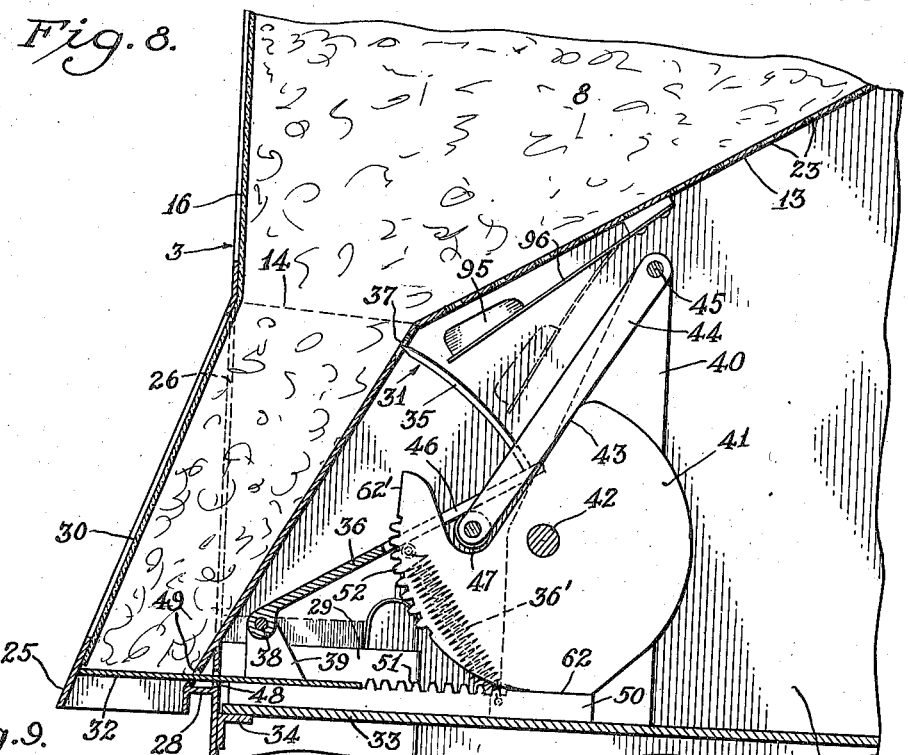
Fig. 8 is a fragmentary vertical sectional view of the machine taken along line 8—8 of Fig. 5.
Figure 9:
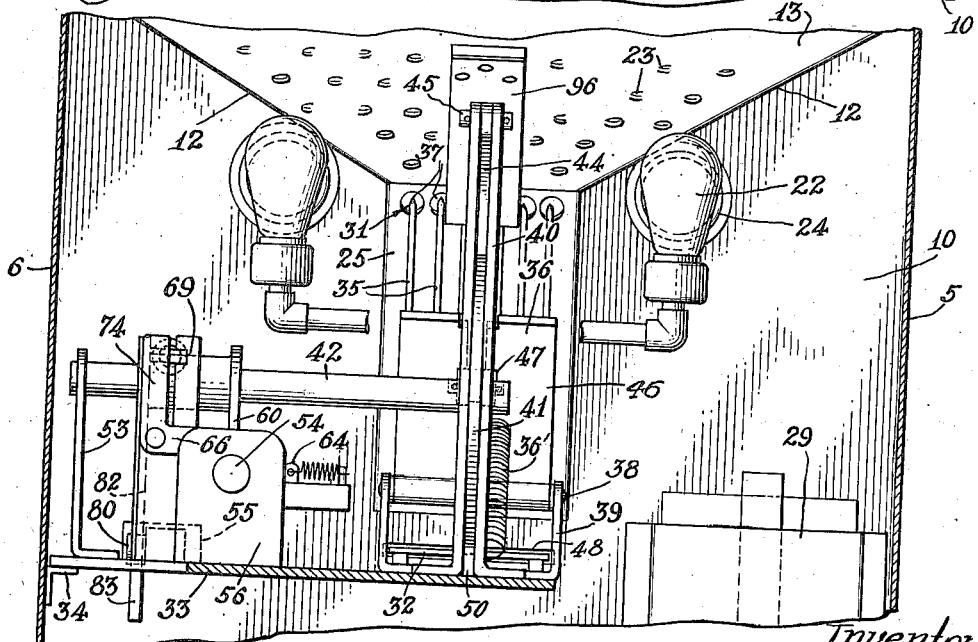
Fig. 9 is a fragmentary vertical sectional view taken along line 9—9 of Fig. 5.

The bar 54 is mounted for reciprocation in suitable brackets 56 on the base plate 33, and may be actuated by any desired means. Preferably, the bar 54 extends through a bushing 57 on the front wall 3 of the compartment 10 for manual actuating from the front of the machine. One side of the bar 54 carries a roller 58 which engages in a slot 59 in the free end of a bifurcated arm 60 fixed on the shaft 42. A coiled tension spring 61 anchored at opposite ends to the wall 3 and the arm 60 tends to urge the bar 54 forwardly, and hence to return the cam disk 41 into initial position. This position is defined by a flat face 62 on the disk 41 movable into engagement with the top of the rack bar 50, as shown in Fig. 8. A face 62' defines the other extreme position of the disk 41.

Mounted on one of the brackets 56 and normally disposed in self-centered position in a longitudinal notch 63 in one side of the bar 54, is a spring-actuated locking pawl 64. Upon inward movement of the bar 54, the pawl 64 is deflected rearwardly, and subsequently is adapted to snap into engagement with the rear side of a V-notch 65 to lock the bar against return movement. Such locking engagement occurs upon rotation of the cam disk 41, for example, through about 40°, and does not prevent continued inward movement of the bar 54. Shortly thereafter, rotation of the cam disk 41, for example, through about 45°, completes the closing of the valve 31, and at about this same time a spring-actuated holding pawl 66, also pivoted on the inner bracket 56, is adapted to snap into an elongated longitudinal notch 67 in the top of the bar 54 to prevent opening of the valve 31. The notch 67 is of such length that the pawl 66 will not interfere with a free back and forth rotation of the cam disk 41 through, for example, a second 45° range to effect repeated opening and closing of the valve 32. After engagement of the pawl 66 in the notch 67, for example, upon rotation of the cam disk 41 through about 70°, the locking pawl 64 will snap into a second notch 68 in the side of the bar 54 of sufficient depth to permit reversal of the pawl 64, and thereafter only the pawl 66 prevents withdrawal of the bar through the initial range. It will be evident that after engagement of the pawl 64 in the notch 65, the disk 41 must be rotated at least through 70° to partially open the valve 32 before the bar 54 can be returned to initial position, and that after closing of the valve 31, the bar may be reciprocated repeatedly to open and close the valve 32. Upon closing, the valve 32 is adapted to strike the front wall of the spout 25 with a jar to release any corn that may be lodged therein.

Provided the locking pawl 64 has reversed, the bar 54 may be released for spring return into initial position by lifting the holding pawl 66 from the notch 67. The means for this purpose comprises a release rod or bar 69, the forward end of which is connected to a push button 70 extending slidably through a bushing 71 on the front wall 3, and the rear end of which is slidably guided in a notched plate 72 on the bracket 56, and has an inclined cam face 73 adapted to engage an arm 74 on the pawl 66 to lift the latter. A spring 75 tends to retract the bar 69. If the button 70 should not be actuated by the customer after receiving the purchase, the spring 61 will urge the bar 54 forwardly within the range permitted by the notch 67 to close the valve 32 for sanitary purposes.

Inward movement of the operating bar 54 sufficiently to open the valve 32 as described is, however, prevented by the coin mechanism 55 unless a proper coin, for example, a five cent piece, is inserted. The coin mechanism may be any one of various standard types, and is not shown in full detail since per se it forms no part of the invention. For purposes of illustration, it is shown as comprising a coin slot 76, a reciprocatory coin bar 77, a coin chute 78, and pawl means 79 for preventing full inward movement of the bar unless a coin is inserted in the slot. After a predetermined inward movement, the coin bar 77 is locked to retain the coin, and must be actuated through its full range to drop the coin into the chute 78 and permit return of the bar to initial position.

The inner end of the coin bar 77 carries a roller 80 which normally engages in a radial slot 81 in a plate sector 82 fixed on the shaft 42. The rear edge of the slot 81 is defined by an arm 83 adapted for engagement with the roller 80. By reason of the roller 80 and slot 81 engagement, rotation of the sector 82 through the initial range of 45° is attended by inward movement of the coin bar 77. In the course of this movement, the locking pawl 64 engages the notch 65 to prevent reverse movement before the coin bar 77 has completed its full movement. After leaving the slot 81, the roller 80 abuts against the arcuate periphery of the sector 82 to prevent withdrawal of the coin bar 77 until the machine cycle has been completed, thereby preventing inadvertent loss of the coin. After reversal of the pawl 64, which insures at least a partial opening of the valve 32, and selective actuation of the release button 70, the sector 82 will return to initial position, and in the course of this movement the arm 83 will pick up the roller 80 to return the coin bar 77.

To facilitate filling of the spout 25, a vibrator may be mounted on the rear wall 13 of the hopper 8. This vibrator comprises a rubber head 95 on the free end of a leaf spring or reed 96. In closing the valve 31, the end of the plate 36 engages and slips past the end of the reed 96. In opening the valve 31, the plate 36 flexes the reed 96 downwardly as indicated in dotted outline in Fig. 8, and then releases the reed, thereby causing the latter to vibrate and effect a series of impacts of the head 95 against the wall 13 to jar the pop corn.

Figs. 10 and 11 illustrate a modified form of the invention in which a coin selector 84 of a different type is employed. The selector 84 comprises a housing 85 mounted within the compartment 10$^a$, a coin slot 86 opening to the housing and through which the coin is adapted to drop by gravity, coin selector means 87 operable by the shaft 42$^a$ to drop the coin after a predetermined degree of rotation, a coin receptacle 88 adapted to receive the coin from the housing, a coin return box 89 and a chute 90 for directing rejected coins to the box.

Apart from the coin selector 84 and the means for operating the shaft 42$^a$, the two forms of the invention are identical, and hence the like parts thereof are identified by the same reference numerals, with the addition of the exponent $a$ in Figs. 10 and 11.

Fixed to the shaft 42$^a$ is a a bifurcated arm 60$^a$ engaging a roller 58$^a$ on a push bar 54$^a$ reciprocable in the upstanding ends 91 and 92 of a U-shaped bracket 93 on the base plate 33$^a$. The bar 54$^a$ is formed in the top with a V-notch 65$^a$ and an elongated longitudinal notch 67$^a$. A spring-centered locking pawl 64$^a$ is mounted on the bracket end 92 for engagement in the notch 65ᵃ upon inward movement of the bar 54ᵃ sufficiently to close the valve 31ᵃ, and for reversal in the slot 67ᵃ upon continued movement of the bar to open the valve 31ᵃ. A spring-actuated holding pawl 66ᵃ is slidably mounted on the bracket end 92 for engagement in the notch 67ᵃ to permit repeated actuation of the valve 32ᵃ while preventing retraction of the bar 54ᵃ sufficiently to open the valve 31ᵃ. The pawl 66ᵃ is adapted to be lifted, to release the bar 54ᵃ, by a release bar 69ᵃ having an actuating button 76ᵃ. The inner end of the bar 69ᵃ is guided in a slot 94 in the bracket end 92, and has an inclined cam face 73ᵃ adapted upon rearward movement to engage and retract the pawl 66ᵃ.

I claim as my invention:

1. A pop corn vending machine comprising, in combination, a cabinet having a front wall and having a hopper enclosed in said cabinet and adapted to contain pop corn in bulk, a forwardly and downwardly inclined spout opening from the bottom of said hopper on an angle through said front wall to the front exterior of said cabinet, cut-off and discharge valves respectively in the upper and lower ends of said spout, and actuating means operable manually to open and close said valves alternately and in sequence, said actuating means being a self-contained unit mounted within and removable bodily from said cabinet.

2. A pop corn vending machine comprising, in combination, a cabinet having a front wall and having a hopper enclosed in said cabinet and adapted to contain pop corn in bulk, a measuring and delivery spout opening from the bottom of said hopper and extending forwardly and downwardly through said front wall to the front of said cabinet, a cut-off valve controlling communication of said spout with said hopper, a discharge valve controlling the outlet of said spout, and actuating means operable through a cycle to close said cut-off valve, then to open and close said discharge valve and then to open said cut-off valve.

3. A pop corn vending machine comprising, in combination, a cabinet having a hopper adapted to contain pop corn in bulk, a measuring and delivery spout opening from the bottom of said hopper to the front of said cabinet, a cut-off valve controlling communication of said spout with said hopper, a discharge valve controlling the outlet of said spout, actuating means for operating said valves in timed relation, said means being movable through an initial range to close and open said cut-off valve and through a final range to open and close said discharge valve, detent means automatically operable upon movement of said actuating means into said final range to confine the movement of said actuating means in said final range, and means available at will for releasing said detent means.

4. A pop corn vending machine comprising, in combination, a cabinet having a hopper adapted to contain pop corn in bulk, a measuring and delivery spout opening from the bottom of said hopper to the front of said cabinet, a cut-off valve controlling communication of said spout with said hopper, a discharge valve controlling the outlet of said spout, actuating means for operating said valves in timed sequence, said means being initially movable in one direction first through a first predetermined range to close said cut-off valve and then through a second predetermined range to open said discharge valve, and being finally movable in a reverse direction first through said second range to close said discharge valve and then through said first range to open said cut-off valve, and locking means automatically operable as an incident to said initial movement at a predetermined point prior to said second range to lock said actuating means against reverse movement and at a second predetermined point in said second range to release said actuating means for reverse movement.

5. A pop corn vending machine comprising, in combination, a cabinet having a hopper adapted to contain pop corn in bulk, a measuring and delivery spout opening from the bottom of said hopper to the front of said cabinet, a cut-off valve controlling communication of said spout with said hopper, a discharge valve controlling the outlet of said spout, actuating means for operating said valves in timed sequence, said means being initially movable in one direction first through a first predetermined range to close said cut-off valve and then through a second predetermined range to open said discharge valve, and being finally movable in a reverse direction first through said second range to close said discharge valve and then through said first range to open said cut-off valve, locking means automatically operable as an incident to said initial movement at a predetermined point prior to said second range to lock said actuating means against reverse movement and at a second predetermined point in said second range to release said actuating means for reverse movement, detent means automatically operable independently of said locking means and as an incident to said initial movement into said second range to confine the movement of said actuating means to said second range, and means available at will for releasing said detent means.

6. A pop corn vending machine having a cabinet with a front wall, a hopper in said cabinet against said wall and adapted to contain pop corn in bulk, a delivery and measuring spout opening from the bottom of said hopper through said front wall, a closed transparent window in said wall immediately above said spout through which the pop corn in said hopper may be observed, and a closed transparent window in the front of said spout and extending substantially the full length thereof through which the pop corn in said spout may be observed, the front wall of said spout being located externally of said cabinet.

7. A pop corn vending machine comprising, in combination, a cabinet, a hopper in said cabinet having a perforated bottom wall, a measuring and delivering spout opening from the bottom of said hopper to the front of said cabinet, a pop corn receptacle removably mounted in said cabinet above said hopper and having a removable bottom wall, and heating means in said cabinet below said perforated wall.

8. A pop corn vending machine comprising, in combination, a cabinet, a hopper in said cabinet, a measuring and delivering spout opening from the bottom of said hopper to the front of said cabinet, valve means for controlling the filling and emptying of said spout, and a pop corn receptacle removably mounted in said cabinet over said hopper, said receptacle being normally closed and having a bottom wall adapted to be removed when said receptacle is in position to drop the corn into said hopper.

9. A pop corn vending machine comprising, in combination, a cabinet having a hopper adapted to contain pop corn in bulk, a spout opening from the bottom of said hopper to the front of said cabinet, cut-off and discharge valves respectively for closing the upper and lower ends of said spout, and actuating means for operating said valves alternately and in sequence including a rotary shaft, a bifurcated arm fixed on said shaft, an actuating bar reciprocable in said cabinet and carrying a roller engaging in said arm to rotate said shaft, and releasable detent means coacting automatically with said bar when said cut-off valve is closed to prevent opening of said cut-off valve while permitting continued opening and closing of said discharge valve.

10. A pop corn vending machine comprising, in combination, a cabinet, a hopper in said cabinet and defining an underlying compartment, a measuring and delivering spout opening from the bottom of said hopper to the front of said cabinet, a hinge plate in said compartment and carrying a plurality of prongs constituting a cut-off valve movable into and out of the upper end of said spout, a slide valve movable into and out of the lower end of said spout, a gear rack connected to said slide valve, a rotary cam mounted in said compartment and having a flat area movable into engagement with said gear rack to limit rotation in one direction, a lever mounted for swinging movement in said compartment and riding on said cam and having rollers engaging said plate to close said cut-off valve upon initial rotation of said cam through a predetermined arc, a gear sector formed on said cam and adapted to engage said gear rack to open said slide valve upon continued rotation of said cam through a second predetermined arc, and means for rotating said cam.

11. A pop corn vending machine comprising, in combination, a cabinet, a hopper in said cabinet, a measuring and delivering spout opening from the bottom of said hopper to the front of said cabinet, a hinge plate carrying a cut-off valve movable into and out of the upper end of said spout, a discharge valve movable into and out of the lower end of said spout, a gear rack connected to said slide valve, a rotary cam, a lever mounted for swinging movement and riding on said cam and engaging said plate to close and open said cut-off valve upon reversible rotation of said cam through a predetermined phase, a gear sector formed on said cam and adapted to engage said gear rack to open and close said discharge valve upon reversible rotation of said cam through a second predetermined phase, and means for rotating said cam.

12. A pop corn vending machine comprising, in combination, a cabinet having a hopper adapted to contain pop corn in bulk, a spout opening from the bottom of said hopper to the front of said cabinet, cut-off and discharge valves respectively in the upper and lower ends of said spout, actuating means operable manually to open and close said valves alternately and in sequence, and a vibrator operable by said actuating means to engage said hopper upon opening said cut-off valve.

13. A pop corn vending machine comprising, in combination, a storage hopper, a delivery spout opening from said hopper, inlet and outlet valves for said spout, means for actuating said valves alternately and in timed sequence and including a rotary drive shaft and a reciprocatory bar connected thereto for synchronous movement, said bar being formed in one side with a locking notch and a second notch, and a reversible spring-centered locking pawl being deflectable by said bar upon movement in a direction to close said inlet valve for coaction with said locking notch to prevent reverse movement of said bar, and in the continued movement of said bar being movable into said second notch permitting self-centering of said pawl and reversal of said pawl upon return movement of said bar in the reverse direction.

14. A pop corn vending machine comprising, in combination, a storage hopper, a delivery spout opening from said hopper, inlet and outlet valves for said spout, means for actuating said valves alternately and in timed sequence and including a rotary drive shaft and a reciprocatory bar connected thereto for synchronous movement, said bar being formed in one side with a locking notch and a second notch, a reversible spring-centered locking pawl being deflectable by said bar upon movement in a direction to close said inlet valve for coaction with said locking notch to prevent reverse movement of said bar, and in the continued movement of said bar being movable into said second notch permitting self-centering of said pawl and reversal of said pawl upon return movement of said bar in the reverse direction, a segment having a radial slot and fixed on said shaft, and a reciprocatory bar having a follower normally engaging in said slot, said follower upon rotation of said segment through a predetermined arc leaving said slot and engaging the periphery of said segment to lock said bar against withdrawal during the continued rotation of said segment and upon return of said segment re-entering said slot and coacting therewith to return said bar to initial position.

EINAR TVETER.